United States Patent

[11] 3,589,202

[72] Inventor Richard B. Stanley
4 Conventry on Duxbury, Plum Grove Village, Rolling Meadows, Ill.
[21] Appl. No. 808,522
[22] Filed Mar. 19, 1969
[45] Patented June 29, 1971

[54] LINEAR ACTUATOR
22 Claims, 22 Drawing Figs.
[52] U.S. Cl. .................................................. 74/25
[51] Int. Cl. ...................................................... F16h 21/16
[50] Field of Search ............................................ 74/25

[56] References Cited
FOREIGN PATENTS
353,595 5/1961 Switzerland.................. 74/25

Primary Examiner—Fred C. Mattern, Jr.
Assistant Examiner—Wesley S. Ratliff, Jr.
Attorney—Mann, Brown, McWilliams & Bradway ABSTRACT: The disclosure pertains to a device for converting rotary motion to linear motion that enables the provision of high force over long distance at low speeds providing a force conversion ratio on the order of 200 to 1 or better operating at 80 to 95 percent efficiency, and that is self-compensating to overcome inertia, in which a shaft member and a tubular member are mounted in concentric telescoping relation, and a bearing unit in the form of inner and outer races and rolling bearings interposed therebetween is wedged between the two in eccentric relation thereto with one of the races serving as a rolling element and being formed with a spherically contoured surface that establishes an elongate rolling contact area with the member to be moved linearly, and a ball wedge lock is established between the member that is rotated and the race that serves as the rotating element of the bearing. The bearing unit is mounted in a fixed plane at an acute angle transversely of the device members and has the axis of rotation of its rotating race lying in the plane that includes the axis of rotation of the rotating member. The position of the area of rolling contact between the rolling race and the linearly movable member relative to said plane of said axes establishes the pitch of the device, and the bearing unit is spring-biased to maximum pitch position, it being self-compensating to decrease pitch and increase the force conversion factor in overcoming inertia and moving heavy loads.

Either the inner or the outer member may be rotated to provide linear movement of the other member, and in practice the bearing unit is employed as a set of three such units forming a bearing assembly arranged to balance the forces acting through the device. Several different specific embodiments are disclosed.

INVENTOR
RICHARD B. STANLEY

BY
Mann, Brown & McWilliams
ATTORNEYS

INVENTOR
RICHARD B. STANLEY

BY
Mann, Brown & McWilliams
ATTORNEYS 3,589,202

1

LINEAR ACTUATOR

My invention relates to, broadly speaking, a linear actuator, and more particularly, to a device for converting rotary motion to linear motion with high force conversion factors over any desired distance at low speed, and the present application deals with arrangements of the general type described in my application Ser. No. 807,506, filed Mar. 17, 1969.

Existing mechanical devices for converting rotary motion into linear motion fall into one of three basic groups, namely screw and nut devices which provide reasonable force conversion ratios at low efficiency, ball nut devices which provide high efficiency but with low force conversion ratios, and rack and gear devices which provide low force conversion ratios at low efficiency. So far as I am aware, there was no known mechanical method, prior to my invention, for converting rotary motion to linear motion with both high conversion ratios at high efficiency.

Furthermore, while the commonly used solenoid-type device provides low force application at high speed for a short distance using electrical energy, so far as I am aware, there is no known method of using electrical energy to provide high force at low speed over a comparatively long distance.

One arrangement that has been devised in an effort to meet some of these needs is disclosed in Uhing U.S. Pat. No. 2,940,322. In one form of device disclosed in this patent, an annular ball bearing unit in the form of a ring made up of inner and outer races with bearing balls interposed therebetween embraces a rotating shaft in frictional engagement therewith, with the ring being angularly and eccentrically disposed with respect to the shaft and pressed against same by a spring. The sliding contact that the ring inner race makes with the shaft surface on rotation of the shaft when the ring is disposed at a canted angle with respect to the shaft produces a linear movement of the ring relative to the shaft that is transmitted to any component that the ring is connected to. Variation of the canted angle of the ring with respect to the shaft varies the pitch of the device.

In an alternate converse form, the ring is mounted inside a tubular shaft that is rotated to provide linear movement of the ring.

While the Uhing device provides desirable simplification, the forces that can be transmitted through it are quite limited even though the pitch can be widely varied, due to the fact that the coupling of the ring to the rotating shaft is effected only through spring action that is independent of the loads imposed on the unit, and the resulting frictional bearing action that the ring surface makes on the shaft. When the weight or amount of resistance on the load being shifted exceeds the frictional forces acting between the shaft and the ring, slippage will occur, which will defeat the linear motion producing action desired.

A principal object of my invention is to provide a linear actuator of simplified form that provides high force conversion ratios with high efficiency and low speed for force applications over any desired distance, and which is adapted to permit the use of electrical energy as its prime mover.

Another principal object of the invention is to provide a linear actuator that is self-compensating to overcome inertia and yet permits the operating motor therefor to operate at maximum output at all times, even under what would ordinarily be considered stall conditions.

A further principal object of the invention is to provide a linear actuator in which the purchase that the motion converting components make with respect to the rotary and linearly moving elements increases as the load increases, making it possible to provide heretofore unachievable force conversion ratios.

Other objects of the invention are to provide a linear actuator-type of force transmitting device that operates with high efficiencies in the range of 80 to 95 percent, to provide a force transmitting device that provides the above indicated advantages while having one-third the weight and occupying one-third the space of comparable devices, and to provide a linear actuator arrangement that is economical of manufacture, convenient to use, and capable of wide application in industry wherever linear movement of one element with respect to another is desired.

Other objects, uses, and advantages will be obvious or become apparent from a consideration of the following detailed description and the application drawings in which like reference numerals indicate like parts throughout the several views.

In the drawings:

FIGS. 11, 12 and 13 are views similar to that of FIG. 1 illustrating alternate forms of my invention, with FIG. 13 also diagrammatically illustrating the manner in which my invention is made self-compensating to overcome inertia and the like;

However, it is to be distinctly understood that the specific drawing illustrations provided are supplied primarily to comply with the requirements of the Patent Code, and that the invention may have numerous variations and applications that are intended to be covered by the appended claims.

GENERAL DESCRIPTION

FIGS. 1—10 diagrammatically illustrate the basic nature of this invention, and for this purpose these figures show several of the fundamental components of the device illustrated in simplified, largely block diagram, form.

Figure 1:
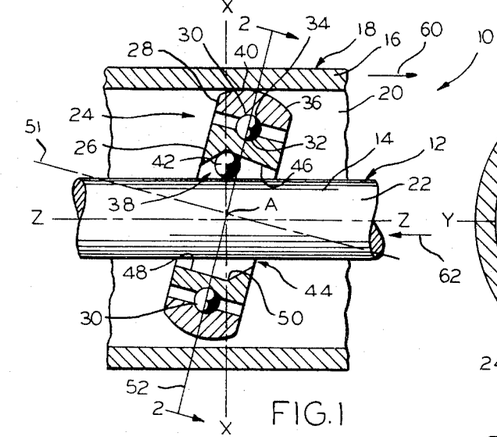
FIG. 1 is a diagrammatic sectional view illustrating certain of the basic components involved in my invention in one simplified embodiment of same.

Referring to FIG. 1, reference numeral 10 diagrammatically illustrates a simplified embodiment of the invention reduced to its most elemental basis for ease of understanding, which comprises a shaft 12 that is preferably selectively rotatable in any suitable manner, as by appropriately coupling same to a suitable driving motor. Shaft 12 is arranged to have at least a portion 14 thereof disposed in telescoping relation with a portion 16 of tubular member 18 which is the member to be moved linearly and is assumed to be attached in any suitable manner to the device or object that is to have linear movement. Tubular member 18 in the form shown is cylindrical in configuration and defines an internal surface 20 which is concentrically related to the external surface 22 of shaft 12, with the shaft 12 thus rotating about the longitudinal axis of the tubular member 18. However, member m8 may be polygonal in configuration 18 provided with surface 20 disposed in the indicated operating relation to shaft 12.

Interposed between the tubular member 18 and the shaft 12 is ball bearing unit 24 that is especially arranged to couple the shaft 12 to the tubular member 18 and not only convert the rotary motion of shaft 12 to linear movement of the tubular member 18, but also provide a force conversion factor for forces applied to shaft 12 for moving loads attached to tubular member 18 that provides a mechanical advantage of 200 to 1 or better.

The ball bearing unit 24 generally comprises an inner race 26, an outer race 28, and a series of bearing balls 30 interposed between the inner and outer races 26 and 28. Bearing balls 30 are disposed in spaced apart relation circumferentially of the bearing by being applied to suitable retainer devices (not shown), and may be sealed in any suitable manner known to the art. The inner and outer races 26 and 28 are respectively formed with raceways 32 and 34 in which the bearing balls 30 ride.

Figure 2:
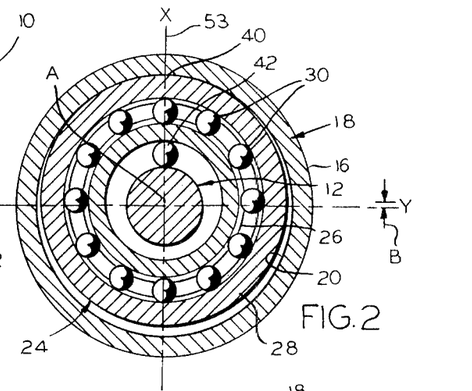
FIG. 2 is a transverse sectional view of the simplified device shown in FIG. 1, taken approximately along line 2–2 of FIG. 2.

The outer race 28 is formed with a spherically contoured bearing surface or periphery 36, and interposed between the inner race 26 and the shaft 12 is ball wedge lock device 38 that locks the inner race 26 to the shaft 12, whereby the inner race 26 is keyed to shaft 12 for rotation therewith, and the bearing unit 24 is eccentrically disposed within tubular member 18 to bring its spherically contoured surface 36 into contact with the inner surface 20 of tubular member 18, as indicated in FIG. 2, as at 40.

The ball wedge lock device 38 generally comprises a bearing ball 42 received within the bore 44 of inner race 26 together with shaft 12 for eccentric positioning of the bearing unit 24 with respect to the shaft 12 and tubular member 18. The inner race bore 44 is of special configuration, it being formed in any suitable manner to define, in the form of FIG. 1, a pair of opposed conically shaped wedging surfaces 46 and 48 which diverge radially inwardly of the inner race, they merging inwardly of either side of the inner race to define an annular corner 50. As indicated in FIG. 1, the bearing unit 24 is disposed at an angle with respect to the shaft 12 and tubular member 18, and in accordance with this invention the bearing unit 24 is mounted to be positioned in a fixed plane 52 that extends perpendicular or at right angles to the plane of the longitudinal axis Z-Z of the shaft 12 and tubular member 18, and parallel to the y-Y axis thereof, but which is inclined at an acute angle with respect to the X-X axis of, and thus the transverse section of, these members. In practice, this angulation can be on the order of 1°, and to either side of the X-X axis, but is shown greatly accentuated to better indicate the angulation.

Assuming for purposes of description that a load is acting on tubular member 18 in the direction of arrow 60, which is resisted by suitable means cooperating with shaft 12, as indicated by arrow 62, the load acting on the tubular member 18 wedges bearing ball 42 between shaft surface 22 and inner race wedge surface 48 to wedge the bearing unit 24 between the shaft 12 and tubular member 18 and thus key the inner race 26 to the shaft 12 for rotation therewith and press the spherically contoured surface 36 of the outer race 28 against the inner surface 20 of the tubular member 18 as at 40. Forces acting in the opposite direction provide a similar result, with ball 42 being wedged between wedge surface 46 and shaft surface 22.

Figure 3:
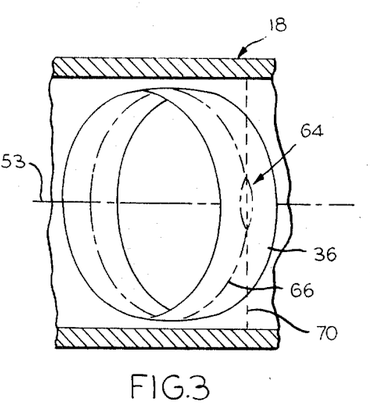
FIGS. 3—10 are diagrams, based on the showing of FIGS. 1 and 2, illustrating the basic nature of my invention.

The contact that the spherically contoured surface 36 of the outer race 28 makes with the inner surface 20 of tubular member 18 is of special significance, and to better bring this out, the surface 36 is shown by itself in the showing of FIG. 3, which is a plan view of the surface 36 as it appears in FIG. 1, positioned as it would appear within tubular member 18. The contact that surface 36 makes with surface 20 of tubular member 18 at 40 is not a point contact, but rather is an elongated contact area that is diagrammatically illustrated in enlarged form at 64, which is substantially bisected by what may be termed a great circle 66 of the surface 36 that passes through the contact at 40; circle 66 is located to one side of the plane 52, and in the showing of FIG. 4 it is shown by itself in association with the contact area 64.

In practice, bore 44 of inner race 26 is made so that it is concentric about the longitudinal (Z-Z) axis of shaft 12 when the bearing unit is disposed at its illustrated angled position relative to shaft 12 with inner race otherwise concentric with shaft 12. The angulation that bearing unit 24 makes with respect to the shaft 12 and tubular member 18 in its operating position disposes the axis of rotation 51 of the inner race at an angle with the longitudinal (Z-Z) axis of shaft 12 but in parallelism with the plane 53 of its X-X axis (that includes the Z-Z axis) and which plane 53 intersects plane 52 in which bearing unit 24 lies along the X-X axis and bisects same along the major axis of the section defined by plane 52. In the position of FIG. 2, axis 51 lies in this plane 53. The operation of ball wedge lock device 38 disposes bearing unit 24 in the indicated eccentric relation to shaft 12, in which the longitudinal center A of inner race bore 44 is disposed to one side of the axis of rotation of shaft 12 a distance B (see FIG. 2) which is thus the mounted eccentricity of the bearing unit relative to the shaft.

On rotation of shaft 12, while the inner race 26 rotates with shaft 12 because of the keying of same to shaft 12 by wedge lock device 38, the outer race 28 does not rotate with respect to the tubular member 18, but merely rides along the inner surface 20 transversely thereof under the throw provided by the eccentric position of bearing unit 24 relative to shaft 12, with the contact area 64 following a circular path transversely of the surface 20 that is indicated by dashed line 70 when the parts are positioned as shown in FIG. 2 relative to member 18. Note that in the position of FIG. 2, area 64 is perpendicular to and is bisected by plane 53 (see FIGS. 3 and 4).

Figure 6:
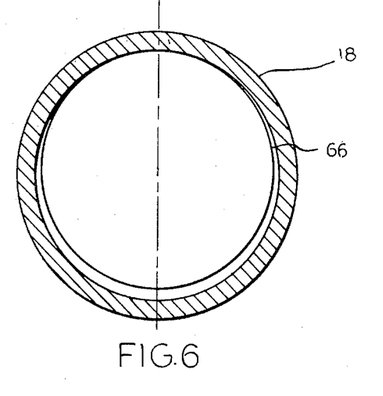
Figure 9:
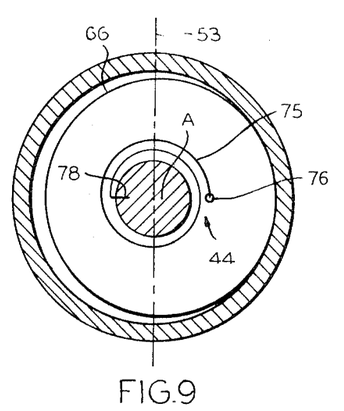

It is a special feature of this invention that the bearing unit 24 as a unit may be rotated relative to tubular member 18 between the positions indicated in FIGS. 6 and 9, wherein the great circle 66 has been employed to illustrate the positioning of the bearing unit 24 with respect to the tubular member 18 for ease of illustration (in FIG. 9, the bearing unit is shown in block diagram form bounded by great circle 66 and inner race bore 44). When the position of FIG. 9 is achieved, the contact area 64 has been shifted axially of shaft 18 to the position indicated in FIG. 7, where the path of movement of the contact area about the circumference of shaft 20 as shaft 12 rotates is indicated by reference numeral 70A. This difference in positioning of the contact area 64 is achieved by shifting the bearing unit 24 90° about the axis of shaft 12 and tubular member 18 so that the area 64 is no longer aligned with the plane 53, which also shifts the orientation of the area 64 relative to the axis of rotation of member 18 from the substantially perpendicular orientation of FIGS. 3 and 4 to the angled orientation shown in FIG. 10, and moves the longitudinal center A of inner race bore 44 as well as axis 51 from the position of FIG. 2 to the position of FIG. 9, relative to plane 53.

Figure 4:
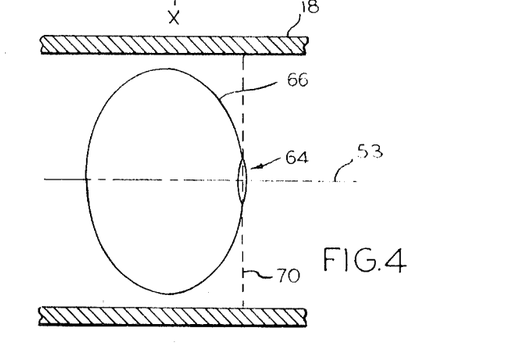
Figure 5:
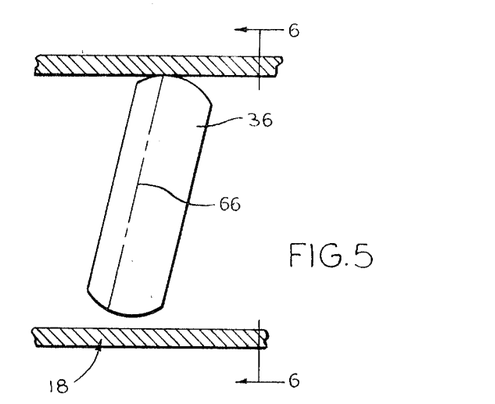
Figure 10:
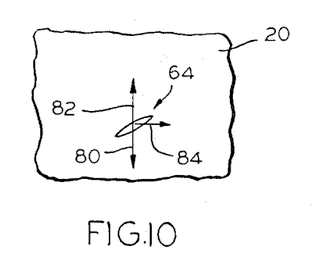

The significance of the foregoing is this: When shaft 12 is rotated with the ball bearing unit 24 positioned as indicated in FIG. 9, the riding action of the outer race 28 along the inner surface 20 of tubular member 18 cams or feeds tubular member 18 longitudinally thereof in a manner similar to a screw threading action except no screw threading is required. As indicated in FIG. 10, bearing unit outer race 28 in riding about the tubular member 18 applies a frictional force to the tubular member 18, by virtue of the rolling friction involved, which acts in the direction of the arrow 80 when the area 64 is moving relative to the tubular member 18 in the direction of the arrow 82. Since area 64 is elongated and is inclined at an acute angle relative to the longitudinal axis of the tubular member 18, as the outer race 28 is rolled about surface 20 it exerts a camming effect on such surface that biases member 18 in the direction of arrow 84. As the bearing unit 24 is shifted 90° in either direction from the position of FIG. 9 (about the shaft 12), the rate of movement of member 18 axially thereof gradually becomes less and less until the position corresponding to that of FIGS. 3 and 4 is achieved, wherein this axial movement becomes zero due to the perpendicular relation of area 64 relative to the longitudinal axis of member 18 and no movement of tubular member 18 is achieved by rotation of shaft 22. However, movement of the bearing unit 24 back to the position of FIG. 9 establishes the maximum feed rate of the tubular member 18 linearly of shaft 22 on rotation of shaft 22.

Thus, the angular relation of the area 64 relative to the longitudinal axis of tubular member defines the pitch and corresponding feed rate of device 10. As pitch is inversely proportional to the force conversion factors of the unit, in accordance with the applicable laws of mechanics, it will be seen that as zero pitch is approached the force conversion factors approach infinity, making available tremendous force output capabilities at slow speed where an adequate purchase between shaft 12 and member 18 can be achieved.

Ball wedge lock device 38, in accordance with this invention, provides such a purchase, and functions to clamp or wedge ball bearing unit 24 between shaft 12 and tubular member 18 with forces that increase as the load increases up to the yield point of the components involved. Consequently, the force conversion ratio provided by my device has an upper limit that theoretically approaches infinity as the pitch drops off to zero, limited only by the yield point of the components involved.

It will thus be seen that my device provides the force magnification or conversion ratios of screw threading without requiring that the screw threading be employed, and which may be varied to suit conditions, which is impossible with conventional screw threading as well as with the more sophisticated ball nut devices.

Thus, when the bearing unit 24 is positioned as shown in FIG. 9, the position of maximum pitch, maximum linear speed, and minimum force conversion ratio exists (which is defined by the angulation of plane 52). As the bearing unit 24 is turned to the position of FIG. 2, or to the diametrically opposite position, pitch decreases to zero at zero linear speed and force conversion ratios increase to a theoretical infinity thus making available at tubular member 18 maximum force acting longitudinally thereof that is greatly magnified over input force supplied by the operating motor.

This general relationship of parts permits my invention to achieve two significant objectives, namely, make available at the tubular member 18 a large amount of linearly acting thrust for moving heavy loads while employing a drive of moderate torque capacity, and also enable the prime mover of the shaft 12 to operate at full capacity under both light loads as well as loads that would normally be considered enough to stall the motor, merely by providing for adjustment of the bearing unit 24 in accordance with the force conversion factor needed to handle the load. For load situations beyond the capacity of the mechanism, the zero pitch position is employed which permits the driving motor to operate at maximum output since no linear drive is being transmitted to tubular member 18.

An important feature of the present invention is that the bearing unit 24 is spring biased to the maximum pitch position of FIG. 9, this being diagrammatically illustrated in FIG. 9 by the diagram-type illustration of suitable torsion spring 75 connected between the bearing unit inner race as at 76 and the shaft 12 as at 78. Thus, in the organization of parts illustrated in FIGS. 1—10, forces acting on the tubular member 18 in the direction indicated by the arrow 60 of FIG. 1 will tend to shift the bearing unit 24 rotationally about the Z-Z axis from the position of FIGS. 7 and 9 to the position of FIGS. 2 and 3 as the load increases, torsion spring 75 automatically deflecting under the load. Forces acting in the other direction deflect the spring 75 oppositely, that is, to a position diagrammatically opposite that of FIGS. 2 and 3 when the capacity of the unit is reached. Spring 75 should have the same spring rate resisting torsion in either direction, a common characteristic of torsion springs.

Figures 7, 8:
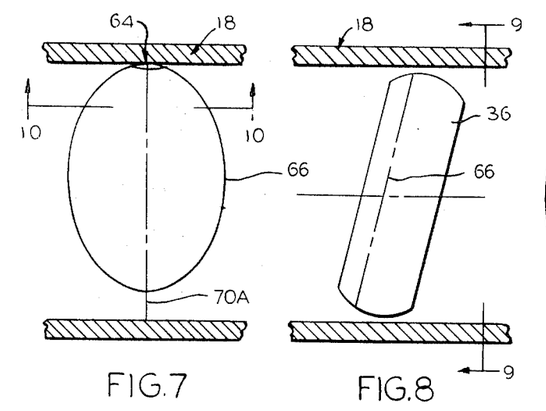

As an illustration of the force conversion ratios that can be built into a device constructed in accordance with my invention, assuming it is desired to have a minimum 100 to 1 force conversion ratio, it is known that a lead of about 0.060 inches is required to permit a one pound force applied about a radius of 1 inch to provide an output of 100 pounds. By providing for a 1° angulation of the bearing unit with a 2 inch diameter shaft 12 will provide the 0.060 inch lead with the bearing unit positioned as indicated in FIGS. 7 and 9. As the load increases and torsion spring 75 deflects under the load, the lead or pitch of the device 10 decreases, reducing the speed of feed a corresponding amount but correspondingly increasing the force magnification up to a theoretical infinity. The principle involved may be better understood by making reference to the familiar first class lever which is the fundamental principal behind screw threading, as by assuming a force of 1 pound acting through a leverage of 6 inches (the approximate circumference of a 2 inch diameter shaft), which provides a force of 100 pounds acting through a distance of 0.060 inch on the other side of the fulcrum. As the 0.060 inch dimension decreases, the force available at that side of the fulcrum necessarily increases a corresponding amount in accordance with the laws of mechanics involved.

It will thus be seen that the special combination of the force conversion ratios and ball wedge lock device 38 of my invention permits the device 10 to provide, in addition to linear movement of the tubular member 18, unusually large force outputs acting in a linear direction, thereby permitting relatively small dimensioned units 10 to make available a large force of output if desired. Furthermore, when the device is first actuated, the inertia of a load is readily handled by the bearing unit 24 immediately deflecting to the pitch position required to start moving the load without overloading the drive motor, the bearing unit returning to a position approaching that of FIG. 9 when momentum has been achieved.

The device 10 operates equally well in either direction regardless of whether the bearing unit is inclined to the right or to the left of FIG. 1. Since the bearing unit outer race 28 does not rotate with respect to the sleeve 18, but merely rolls along its inner surface 20, rolling friction is all that adversely affects efficiency, and consequently efficiencies on the order of 80 to 95 percent are available. The motor driving the device 10 may operate at full output at all times, and the length of application of the output forces is limited only by the desired length of the tubular member 18 in relation to the job that the device 10 is to perform.

Figure 11:
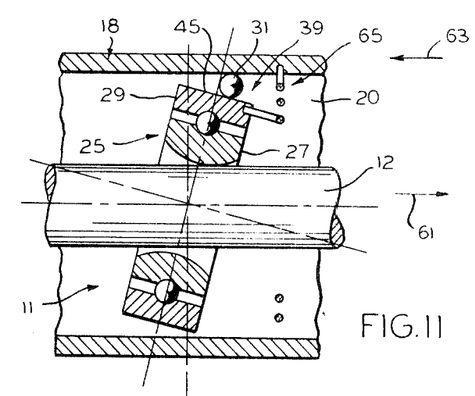

FIG. 11 illustrates an embodiment 11 which is the converse of device 10, wherein the ball wedge lock 39 is between the outer race 29 of bearing unit 25 and the inner race 27 is provided with the spherically contoured surface 37 that rides on shaft 12, with the tubular member 18 being rotated to move shaft 12 axially thereof. The bearing ball 31 of ball wedge lock 39 cooperates between the inner surface 20 of member 18 and wedge surface 45 formed on the periphery of outer race 29. Forces acting in the directions 61 and 63 provide the result desired, a contact area between surface 37 and shaft 12 similar to area 64 being established and a torsion spring arrangement 65 similar to spring 75 being provided between outer race 29 and tubular member 18 to provide for automatic pitch change as the load increases. While device 11 as illustrated acts only in one direction modification of outer race surface 45 to provide the reverse of wedge lock surfaces 46 and 48 would make device 11 double acting, which showing is omitted to avoid complexity.

It is preferable that the bearing ball of the ball wedge lock devices be biased against the wedge surfaces of the bearing unit to avoid backlash. The ball wedge lock devices 80 and 82 of the respective embodiments of FIGS. 12 and 13 provide this and thus are preferred, FIG. 13 also diagrammatically illustrating in largely block diagram form a single bearing unit type linear actuator device 84 having all the essentials necessary for practice of my invention, the linear actuator device 86 of FIG. 12 being illustrated in the same manner as device 10 except for the showing of the specific ball lock device 82.

Figure 15:
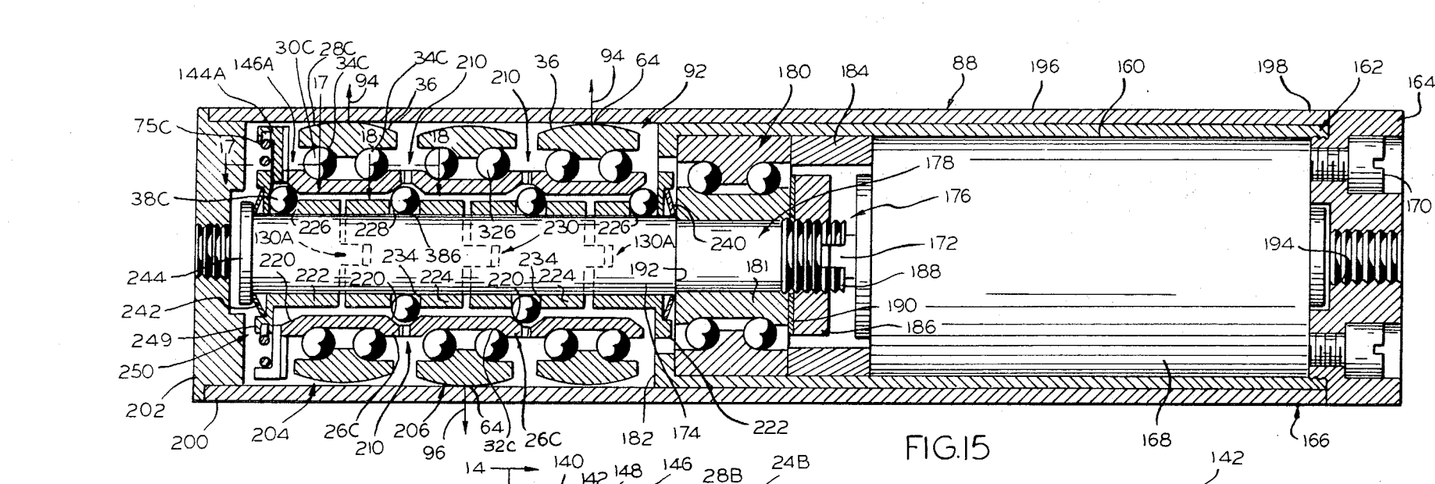
FIG. 15 is a longitudinal sectional view, partially in elevation, through a specific linear actuator device arranged for commercial application and embodying the principles of this invention.
Figure 16:
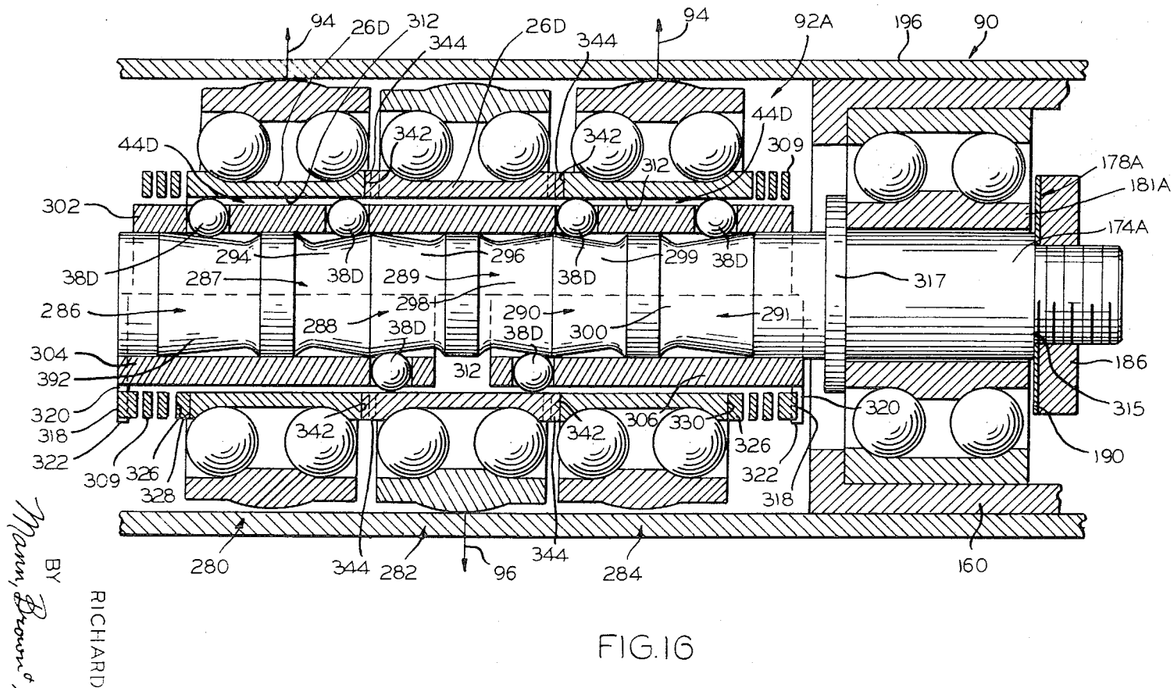
FIG. 16 is a view similar to that of FIG. 15 illustrating a modified form of the device.
Figure 17:
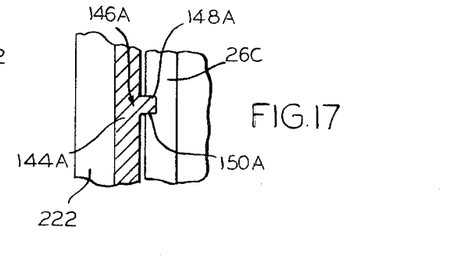
FIGS. 17 and 18 are fragmental sectional views taken substantially along line 17–17 and 18–18 of FIG. 15.

FIGS. 15 and 16 illustrate the principles of this invention applied to two different linear actuators 88 and 90 that are arranged for practical application to specific jobs to be done. In these devices, the bearing units are grouped as a series of three in a bearing assembly 92 and 92A, respectively, with the individual bearing units keyed together at their inner races against rotation relative to each other, and with two of the bearings acting on one side of the device and the third acting on the other side of the device to provide the balanced force condition indicated by arrows 94 and 96.

SPECIFIC DESCRIPTION

Figure 12:
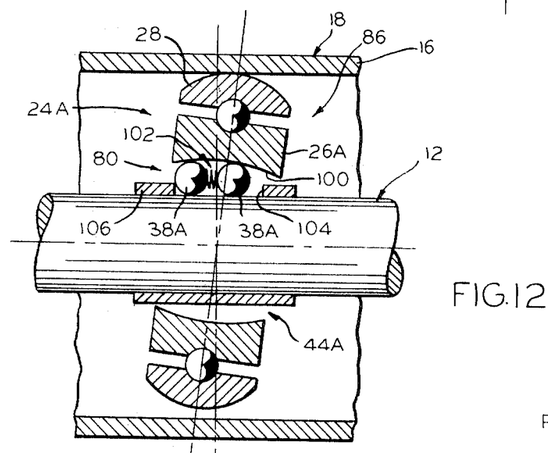
Figure 13:
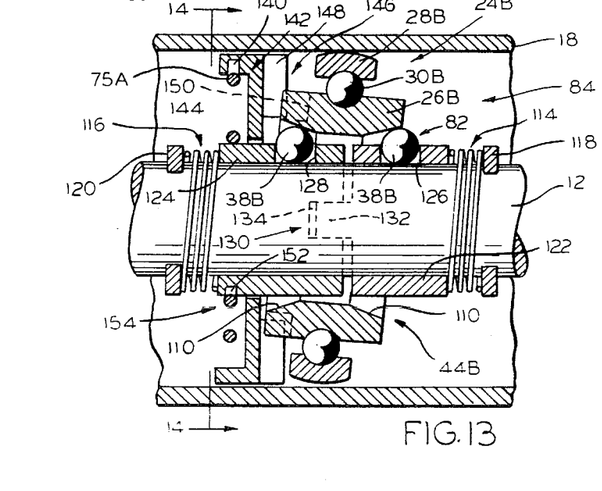

Referring now back to the embodiment of FIG. 12, which is the same as that of FIGS. 1—10 except for the ball wedge lock device 80, as indicated by corresponding reference numerals, the ball wedge lock device 80 generally comprises a pair of bearing balls 38A positioned as indicated in FIG. 12 between the outer race 26A of bearing unit 24A and the shaft 12, with the bore 44A of the inner race 26A being formed to define spherically contoured concave surface 100 against which the balls 38A engage, the balls 38A being biased in opposite directions by a suitable biasing spring generally indicated at 102, which is only diagrammatically illustrated, but which may be any form of spring suitable for the purpose. Balls 38A for control purposes are applied within a slot 104 formed in sleeve 106 that is received over shaft 12 and within bore 44A of bearing unit inner race 26A. Slot 104 is proportioned to permit movement of balls 38A only axially of shaft 12. The spring 102 maintains the balls 38A in locking arrangement with the inner race 26A regardless of direction of application of forces involved so that backlash is precluded. Thus, the device 86 can provide linear motion of tubular member 18 in either direction without backlash.

The device 84 (FIG. 13) includes in diagrammatically illustrated form the preferred type of ball wedge lock arrangement 82 in which the bore 44B of the inner race 26B is formed to define outwardly diverging conical surfaces 110 and 112 that the respective bearing balls 38B of lock device 82 cooperate with in the manner contemplated by this invention.

In the linear actuator device 84, the spring biasing contemplated for balls 38B is provided by suitable compression springs 114 and 116 acting between the respective lock rings 118 and 120 and the respective sleeves 122 and 124 that are respectively formed with slots or openings 126 and 128 in which the respective bearing balls 38B are mounted (openings 126 and 128 being proportioned to closely receive the respective bearing balls 38B). The sleeves 122 and 124 are keyed together for simultaneous rotation with shaft 12, as by employing the tongue and groove slot structure indicated at 130 in which the sleeve 122 is provided with a projection 132 slidably fitting within slot 134 of sleeve 124, the structure 130 being proportioned so that springs 114 and 116 bring balls 38B into engagement with the respective wedge surfaces 110 and 112 prior to the bottoming of the projection 132 in slot 134.

FIG. 13 also more fully diagrams the manner in which the bearing unit 24B may be spring biased to the maximum pitch or lead position illustrated in FIG. 9, in which torsion spring 75A has its end 140 anchored as at 142 to a disc member 144 that is keyed as at 146 to the bearing unit inner race 26B, disc member 144 being provided with projections or teeth 148 fitting within correspondingly located recesses 150 of the inner race for this purpose. The other end 152 of torsion spring 75A is anchored as at 154 in the sleeve 124, which is essentially stationary with respect to the shaft 12 because of the locking action of the associated bearing ball 38A (recess 128 being proportioned to substantially complement the ball 38B). The relation of the torque spring 75A to the disc member 144 and sleeve 124 as well as the corresponding positioning of the great circle 66 described in connection with FIGS. 1—10 are diagrammatically illustrated in FIG. 14.

It is pointed out that the wedge surfaces defined by the bores 44A and 44B of the respective bearing units 24A and 24B are formed to be concentric with the shaft 12 when the bearing units are so disposed in the angled relation indicated, and the angulation of the bearing units illustrated is intended to illustrate the aforementioned 1° degree angulation even though the actual angle shown is in excess of that to more readily depict what is intended.

Referring now to the showing of FIGS. 15 and 17—19, the linear actuator device 88 is a fully constructed embodiment of my invention intended for practical application to any situation where one element or component is to be moved with respect to the other, as for instance opening and closing a door, or raising and lowering an automobile window. The device 88 comprises a sleeve 160 having secured thereto as at 162 an end cap 164 to provide a housing 166 for suitable operating motor 168 that is secured in place by suitable bolts 170 applied between end cap 164 and the motor housing. Motor 168 may be of any suitable type capable of driving a shaft 172, which is suitably keyed to operating shaft 174, as at 176. Shaft 174 is suitably journaled as at 178 in suitable thrust bearing 180 mounted in housing 166 between its end wall 182 and sleeve 184 against which motor 186 bears. Nut 186 applied to threaded end portion 188 of shaft 174 against lock washer 190 secures the inner race 181 of bearing unit 180 against shoulder 192 of shaft 174 to fix the shaft 174 in its journaled position.

Motor 168 is connected to a suitable source of power in any suitable manner, as through opening 194 of end cap 164, the latter being secured in any suitable manner to a stationary support.

Slidably mounted on sleeve 160 is tubular member 196 which corresponds to tubular member 18 of FIGS. 1—14 and which has its end 198 open to receive the housing 196 and its end 200 closed by end cap 202. Tubular member 196 is suitably connected to the element or component to be moved.

Figure 14:
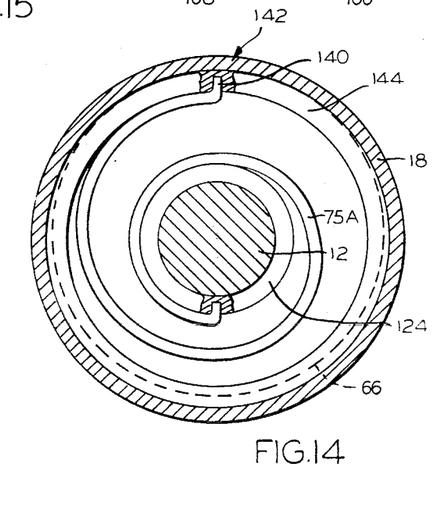
FIG. 14 is a diagrammatic sectional view taken substantially along line 14–14 of FIG. 13.

Mounted on shaft 174 within sleeve 196 is bearing assembly 92 which corresponds in structural arrangement to the diagrammatic illustration of FIGS. 13 and 14 except that the three bearing unit arrangement aforereferred to is employed and the parts are shown arranged in greater conformity with practical engineering design practice.

The bearing assembly 92 generally comprises three bearing units 204, 206 and 208 arranged similar to bearing unit 24A, with the bearing units 204 and 208 being oppositely oriented with respect to bearing unit 206 to provide the balanced force relationship indicated by arrows 94 and 96 (it being assumed that the sum of the laterally acting forces indicated by arrows 94 balances the correspondingly opposite forces illustrated by arrow 96). Thus, the contact areas 64 of units 204 and 208 are diametrically opposed to the corresponding contact area 64 of unit 206, and the wedging surfaces 220 of the respective units 204, 206 and 208 are shaped so that bearing unit 206 bears against sleeve 196 with twice the force of the respective bearing units 204 and 206.

The bearing units 204, 206 and 208 are arranged in accordance with the principles described in connection with FIGS. 1—10 and 14, with the outer races thereof 28C each having the aforedescribed spherically contoured surfaces 36 and being formed with a pair of raceways 34C to accommodate a dual set of bearing balls 30C (spaced axially of shaft 174) that ride on corresponding raceways 32C of inner races 26C.

The inner races 26C are keyed together as indicated at 210 (see FIG. 18), the inner race of the bearing unit 206 being formed with lugs 212 that seat within correspondingly located slots 214 of the inner races of the bearing units 204 and 208; lugs 212 are proportioned so that they bottom in slots 214 without adjacent inner races engaging each other, and between adjacent bearing units, a pair of diametrically located lugs and slots 212 and 214 are employed. The end surfaces of inner races 26C defining the keying are concentric about the respective bores 44C and lie in planes perpendicular to the axis of such bore.

Each bearing unit is equipped with four ball wedge lock bearing balls 38C, disposed in two rows spaced apart axially of the shaft 174, with the balls of each row spaced apart 90° about the axis of the shaft (note FIG. 19), and disposed 45° on either side of the position where the contact area 64 will be;

balls 38C ride on wedge surfaces 220 of the respective inner races 26C. In connection with the bearing units 204 and 208, the bearing balls 38C are respectively seated in an end sleeve 222 and an adjacent inner sleeve 224, the sleeves 222 and 224 being recessed as at 226 and 228 for this purpose, similar to recesses 126 and 128 of sleeves 122 and 124 of FIG. 15. 130 adjacent sleeves 222 and 224 are keyed together as indicated at 130A (in a manner similar to the keying 130 of FIG. 13) while the adjacent sleeves 224 are keyed together in a similar manner as at 230 where they engage each other under the inner race 26C of the bearing unit 206. The sleeves 224 are recessed as at 234 to receive the bearing balls 38C that ride on the inner race of bearing unit 206. The bearing balls 38C of the bearing units 204, 206 and 208 are spring biased against their respective inner race wedge surfaces in a manner similar to the arrangement shown in FIG. 13, spring 240 acting between inner race 181 of bearing unit 180 and the adjacent end sleeve 222, and spring 242 acting between shaft end flange 244 and the adjacent end sleeve 222 providing the desired biasing action.

Figure 18:
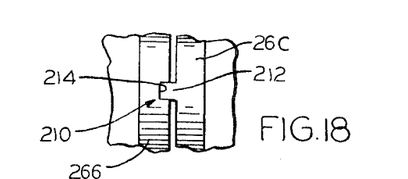
Figure 19:
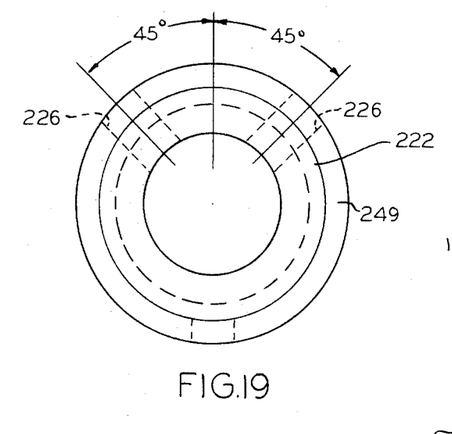
FIG. 19 is an end view of one of the sleeve components forming a part of one of the wedge lock devices employed in the embodiment of FIG. 15.
Figure 20:
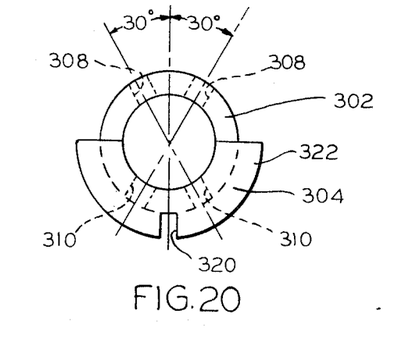
FIG. 20 is an end view of a sleeve component forming a part of the wedge lock devices of the embodiment of FIG. 16.

Associated with the bearing unit 204 is torsion spring 75C having one of its ends connected to disc member 144A in the manner indicated in FIG. 14 in connection with the disc member 144, and having its other end secured to the adjacent end sleeve flange 249 as at 250, in the manner similar to that suggested in FIG. 14 regarding sleeve 124. Disc member 144A is keyed to the adjacent inner race 26C (see FIG. 17) as at 146A (similar to the embodiment of FIG. 13), lugs 148A being received in slots 150A in a manner similar to the keying of adjacent bearing inner races 26C that is shown in FIG. 18.

In operation, assuming the housing 166 is secured to a stationary support and the sleeve 196 is secured to a member to be moved, or vice versa, at the option of the designer, on operation of the motor 186, sleeve 196 is moved relative to housing 166 in the direction desired for linear movement in the direction desired. Reversal of movement of the motor 168 provides linear movement in the opposite direction and under ordinary circumstances it is preferred that the motor 186 be arranged for driving in either direction. Assuming a coefficient of friction of 0.1 between the respective outer races of the bearing units 204, 206 and 208, and assuming a desired 450 pound force output to be provided by the sleeve 196 acting axially thereof, device 88 should be designed to provide 1,500 pounds of axial force at the respective bearing units 204, 206 and 208 to insure a 150 pound frictional force output for each bearing acting longitudinally of sleeve 196. However, the high force conversion ratio that the 150 pounds of each bearing unit can act through, depending on the loads to be carried, renders insignificant the problem of actuating sleeve 196 through rolling friction.

In the embodiment of FIGS. 16 and 20—22, bearing assembly 92A is made up of three bearing units 280, 282 and 284 associated with shaft 174A to provide the ball wedge lock contemplated by this invention in a form in which the ball wedging surfaces are formed in the shaft 174A rather than in the inner races of the individual bearing units.

In this form of the invention, the inner races 26D are keyed together in the manner illustrated in FIG. 15, but are formed to define cylindrical bores 44D on which the individual bearing balls 38D ride. The shaft 174A is machined as at 286, 288 and 290 to define wedging surfaces 292, 294, 296, 298, 299 and 300 which perform the ball wedging functions desired.

In the particular bearing assembly arrangement 92A that is illustrated in FIG. 16, the bearing balls 38D for the bearing units 280 and 284 are mounted in half sleeve element 302, while the bearing balls 38D for bearing unit 282 are mounted in a pair of half sleeve elements 304 and 306 that are aligned axially of the shaft 174. Sleeve elements 302 and 304 are shown in end elevation in FIG. 20 (on a reduced scale), wherein it will be seen that the recesses 308 for the bearing balls 38D of sleeve element 302 are arranged to provide the dual row bearing ball arrangement previously referred to in connection with the embodiment of FIG. 15 except that the bearing balls involved are positioned 30° on either side of where contact area 64 is located, and the recesses 310 of sleeve elements 304 and 306 are similarly constituted.

Torsion springs 309 are applied in compression axially thereof over either end of sleeve element 302 and between the respective sleeve elements 304 and 306 and the end inner races 26D to provide for adjustment of the bearing units 280, 282 and 284 as a unit axially of shaft 174A under load conditions in the manner hereinbefore described, and to maintain the inner races 26D biased together and to bias sleeves 304 and 306 away from each other and axially of the shaft 174; the latter operates to bias the balls 38D of same between the respective wedging surfaces 296 and 298 and the cylindrical wedging surface 312 of bearing unit 282, thus shifting shaft 174A upwardly of the showing of FIG. 9 to bias the bearing balls 38D of sleeve element 302 against the cylindrical wedging surfaces 312 of the bearing units 280 and 284, whereby the ball wedge lock of this invention is provided. For this purpose the angled ends 318 of springs 309 are received in the slot 320 formed in the respective flanged ends 322 and 324 of sleeve elements 304 and 306, while the angled ends 326 of the respective springs 309 are received in the receptive notches 328 and 330 of the inner races 26D of bearing units 280 and 284.

In this embodiment of the invention, the journaling arrangement 178A for shaft 174A is made such that shaft 174A can shift laterally of the bearing unit 180A, as by forming shaft 174A with shoulder 315 that is spaced from its flange 317 several thousandths of an inch longer than the axial dimension of inner race 181A, and a suitable universal joint is employed between the driving motor and shaft 174A to accommodate any off center positioning of shaft 174A with respect to the motor shaft that may be involved.

Figure 21:
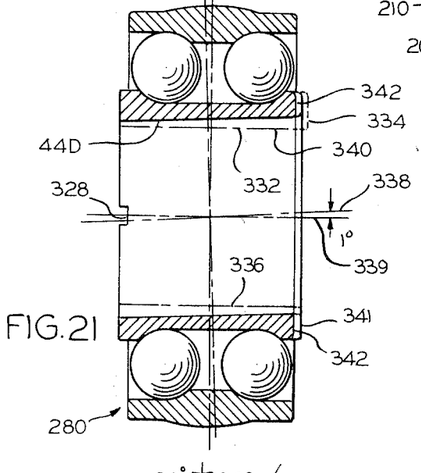
FIG. 21 is a sectional view through 11 left hand end bearing unit of the showing of FIG. 16, taken 90 degrees from the showing of FIG. 16 about the longitudinal axis of the actuator device.
Figure 22:
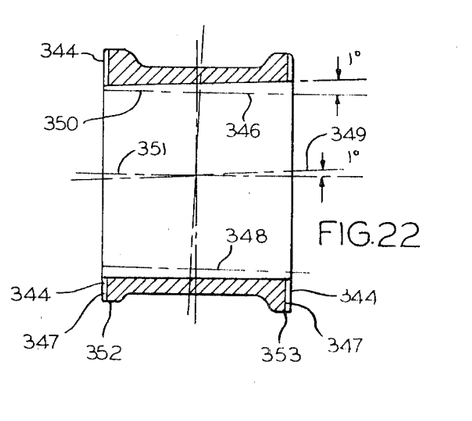
FIG. 22 is a view similar to that of FIG. 21 but illustrating the inner race of the center bearing unit.

FIGS. 21 and 22 illustrate the manner in which bearing units 280, 282 and 284 may be formed from standard ball bearing units. In doing this, only the inner race 26D is modified from a standard ball bearing unit; in the showing of FIG. 21, the broken lines 332, 334 and 336 indicate the excised portions of a standard inner race, which have been removed in any suitable manner to define bore 44D that is concentric about an axis 338 that is 1° (in the embodiment illustrated) off the axial center 339 of the original inner race bore 340, as well as end surface 341 and its recesses 342 that correspond in function to slots 214 of FIG. 18 and receive the respective lugs 344 of the inner race 26D of bearing unit 282. The inner race 26D of bearing unit 282 is formed from a standard inner race in which the excised portions thereof are indicated by broken lines 346 and 248 (that are removed to define the bore 44D thereof which is concentric about an axis 349 that is 1° off the axis 351 of the original inner race bore 350); the ends 352 and 353 of the inner race of bearing unit 282 are indented to define lugs, end surfaces 347 and 344 at either end thereof that serve the function of lugs 212 of FIG. 18, surfaces 347 and end surfaces 356 of lugs 344 being formed to lie in planes that are perpendicular to axis 349. The inner race 26D of FIG. 22 is shown turned end for end 180° in the showing of FIG. 16 to tilt unit 282 oppositely of units 280 and 284. Inner races 26D of units 280 and 284 are also appropriately excised to form slots 328, as should be obvious, and in the positioning of the bearing units 280, 282 and 284 of FIG. 16, surfaces 342 and 347 are disposed in planes that are perpendicular to shaft 174A. Alternately, recess or slots 342 could be formed in the inner race of unit 282 and lugs formed on the inner races of the respective units 280 and 284.

The specific features of device 90 are otherwise similar to the corresponding features shown in FIG. 15, as indicated by corresponding reference numerals.

DISTINGUISHING CHARACTERISTICS OF THE INVENTION

It will thus be seen that I have provided a simplified linear actuator device employing rotary motion to provide linear motion with high efficiency and high force conversion ratios, which is not only of simplified organization and design, but which accommodates inertia automatically and permits the driving motor to run at full output even under conditions that might ordinarily be considered to be of the stalling type. Devices such as devices 88 and 90 provide linear motion in either direction with no backlash, which is a first in the art pertaining to this general subject matter.

The ball lock devices associated with the individual bearing units of my invention effect a locking pressure as a reaction to the restraining force, and consequently, the greater the forces involved, the greater the locking action that is provided. Consequently, forces that can be transmitted through the device can be the maximum that the strength of materials involved in any particular construction will accept without permanent yield, and, of course, strength requirements in individual cases may be accommodated by increasing dimensions and employing stronger materials, etc.

On the other hand, devices comparable to devices 88 and 90 may be quite small in longitudinal and transverse dimension so that use of same for such applications for opening automobile windows is quite practical.

The pitch or throw provided by the devices of this invention changes automatically in accordance with the forces applied to the device and involves shifting the individual ball bearing units employed about the axis of rotation of the driving member so that the bearing units remain permanently positioned in the desired degree of angulation with respect to the transverse section of the device. The degree of angulation is optional and will be governed by the maximum pitch desired. As indicated, it can be in either direction, though in the multiple bearing unit assemblies of FIGS. 15 and 19, the middle bearing unit will be disposed at an angle opposite to the two end bearing unit even though all three operate at the same angle with respect to the driving member.

The torsion spring 75 and its illustrated equivalents for shifting the bearing unit is preferred but the shifting action desired can be effected by employing a suitable hand-operated linkage system, or the bearing unit may be permanently mounted to provide a fixed pitch and force conversion ratio.

Devices constructed in accordance with this invention are especially adapted to provide linear movement under low speed operation with high forces and travels of any desired lengths. It will be apparent that applications for such a device are innumerable, examples being circuit breakers, automobile window openers, door closure automobile jacks, etc. The relatively high efficiencies involved are attributable to the rolling action of the bearing units on the member to be moved. In this connection it should be noted that the rolling race member and the member it linearly actuates do not rotate; for instance in the device 10 the outer race 28 merely rides about surface 20 of tubular member 18, and does not rotate with respect to same. It is this riding action and the positioning of contact area 64 relative to the axis of the rotating member that control and provides the linear movement contemplated by this invention. The angulation of the bearing unit with respect to the driving member sets the maximum pitch or throw available.

While bearing balls have been illustrated as forming the antifriction means between the races of the ball wedge lock devices that have been illustrated, roller bearings and other rolling bearing types would serve the purpose equally as well. These elements are termed "rolling bearings" in one or more of the appended claims.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In a linear actuator,
a pair of members having portions of same in telescoping relation,
a bearing unit interposed between said members at said portions thereof and including a first bearing element riding on one of said members, a second bearing element positioned to be coupled to the other of said members, and antifriction means interposed between said bearing elements,
means for rotating said portion of said other member relative to said one member portion,
and wedge lock means interposed between said second bearing element and said portion of said other member for wedging said bearing unit between said members in a position eccentric to said member portions and coupling said second bearing element to said other members,
said bearing unit being mounted in a fixed plane that extends parallel to the transverse axis of said member portions and that is canted at an acute angle with respect to the transverse section thereof whereby said second bearing element on rotation of said other member portion rotates about an axis that is parallel to the plane that includes the axis of rotation of said other member portion and bisects the section of said member portions that is defined by said fixed plane along the major axis thereof,
said first bearing element and said one member at their contacting portions being formed to define an elongate rolling contact area,
whereby rotation of said other member portion will provide linear movement of said one member portion in proportion to the position of said contact area to one side of the last mentioned plane.

2. In a linear actuator,
a pair of members having portions of same in concentric telescoping relation,
a bearing unit interposed between said members at said portions thereof and including a first bearing element riding on one of said members, a second bearing element positioned to be coupled to the other of said members, and antifriction means interposed between said bearing elements,
means for rotating said portion of said other member relative to said one member portion,
and wedge lock means interposed between said second bearing element and said portion of said other member for wedging said bearing unit between said members in a position eccentric to said member portion with a force proportional to the forces resisting linear movement of said one member and coupling said second bearing element to said other member,
said bearing unit being mounted in a fixed plane that extends parallel to the transverse axis of said member portions and that is canted at an acute angle with respect to the transverse section thereof whereby said second bearing element on rotation of said other member portion rotates about an axis that is parallel to the plane that includes the longitudinal axis of said member portions and bisects the section of said member portions that is defined by said fixed plane along the major axis thereof,
said first bearing element and said one member at their contacting portions being formed to define an elongate rolling contact area extending circumferentially of said first bearing element,
and means for positioning said contact area to one side of the last mentioned plane whereby rotation of said other member portion will provide linear movement of said one member portion.

3. The linear actuator set forth in claim 2 wherein:
said positioning means includes means for automatically disposing said contact area relative to said last mentioned plane in proportion to the force multiplication required to move said one member portion linearly against forces acting against same to oppose such linear movement.

4. The linear actuator set forth in claim 2 wherein:
said wedge lock means comprises:
bearing ball means interposed between said second bearing element and said other member,

PO-1050
(5/69)

UNITED STATES PATENT OFFICE
CERTIFICATE OF CORRECTION

Patent No. 3,589,202          Dated June 29, 1971

Inventor(s) Richard B. Stanley

It is certified that error appears in the above-identified patent and that said Letters Patent are hereby corrected as shown below:

Column 2, line 40, for "eleven" read -- the --.
Column 3, lines 10 through 17 should not be indented.

Signed and sealed this 21st day of December 1971.

(SEAL)
Attest:

EDWARD M. FLETCHER, JR.      ROBERT GOTTSCHALK
Attesting Officer            Acting Commissioner of Patents